United States Patent [19]
Hudspeth et al.

[11] Patent Number: 5,758,017
[45] Date of Patent: May 26, 1998

[54] APPARATUS AND METHOD FOR HEATING EYEGLASS FRAMES

[75] Inventors: James Hudspeth, Tujunga, Calif.; Joshua Freilich, Santa Fe, N. Mex.

[73] Assignee: Western Optical Supply, Inc., Santa Fe, N. Mex.

[21] Appl. No.: 605,353

[22] Filed: Feb. 22, 1996

[51] Int. Cl.⁶ .................................. A61H 33/08
[52] U.S. Cl. .................. 392/379; 392/360; 219/521; 351/178
[58] Field of Search ............... 392/379, 382, 392/383, 340, 344, 345, 347, 349, 350, 360, 361, 362, 365, 367; 219/368, 400, 521; 351/178

[56] References Cited

U.S. PATENT DOCUMENTS

| | | |
|---|---|---|
| 1,654,599 | 1/1928 | Ovington . |
| 1,931,852 | 10/1933 | Reichel . |
| 1,939,443 | 12/1933 | Geiselman . |
| 2,789,200 | 4/1957 | Ebert . |
| 2,853,591 | 9/1958 | Fine . |
| 3,089,942 | 5/1963 | Wrigglesworth . |
| 3,564,202 | 2/1971 | Oppenheim ............ 219/400 |
| 3,637,982 | 1/1972 | Reaves .................. 219/368 |
| 3,816,705 | 6/1974 | Ebert ..................... 219/521 |
| 3,932,114 | 1/1976 | Ebert ......................... 432/5 |
| 4,007,370 | 2/1977 | Ebert ..................... 219/521 |
| 4,027,217 | 5/1977 | Harman ................. 318/313 |
| 4,052,592 | 10/1977 | Ebert ..................... 219/521 |
| 4,054,376 | 10/1977 | Wareham ............... 351/178 |
| 4,121,091 | 10/1978 | Wareham ............... 219/400 |
| 4,348,625 | 9/1982 | Sharp .................... 318/757 |
| 4,567,676 | 2/1986 | Conti ....................... 34/202 |
| 4,658,692 | 4/1987 | Bagus ..................... 84/1.24 |
| 4,731,572 | 3/1988 | Bolie ..................... 318/721 |
| 5,286,951 | 2/1994 | Jones .................... 219/521 |

*Primary Examiner*—Tu B. Hoang
*Attorney, Agent, or Firm*—Jeffrey D. Myers

[57] ABSTRACT

An eyeglass heater includes a fan motor, heater coils, and feedback circuitry for controlling the fan motor and heater coils. A heat conductive housing encloses all components and provides opposed air outlets for directing the heated air upon the work piece (eyeglass frames).

63 Claims, 16 Drawing Sheets

APPARATUS AND METHOD FOR HEATING EYEGLASS FRAMES

BACKGROUND OF THE INVENTION

1. Field of the Invention (Technical Field)

The invention relates to an eyeglass heater assembly, more particularly to a heater comprising a heat-conductive housing and fan motor control circuitry, and methods for using same.

2. Background Art

Eyeglass frame heaters have long been known in the art. Heating eyeglass frames is useful to install lenses and properly fit the frames to a wearer's head. Concomitantly, it is also desirable to be able to rapidly cool the frames to hold a desired shape. Other attributes desirable in an eyeglass frame heater include temperature control, air volume and velocity control, and radiative as well as forced air heating.

Ovington, U.S. Pat. No. 1,654,599, entitled Fitting Table Heater, represents an early spectacle heater employing both convective and radiative heating. The only heat control disclosed is by coiling the resistance wire closer or farther apart.

U.S. Pat. No. 2,789,200, to Ebert, entitled Air Tempering Device, discloses an eyeglass heater employing a blower motor and a thermostatically controlled heating unit. The adjustable thermostat provides some control of heated air temperature. U.S. Pat. No. 3,089,942, to Wigglesworth, et al., entitled Air-Tempering Devices, also discloses a spectacle-type heater using a bimetallic-type thermostat.

U.S. Pat. No. 3,564,202, to Oppenheim, entitled Spectacle Frame Heating Apparatus, discloses an eyeglass heater comprising controls for heating and cycling the frames into and out of the heating compartment.

U.S. Pat. No. 3,637,982, to Reaves, entitled Apparatus for Heating Thermoplastic Frames for Glasses, discloses a forced air eyeglass heater with air-directing baffles.

U.S. Pat. No. 3,816,705, to Ebert, entitled Device for Heating Thermoplastic Eyeglass Frames, discloses an eyeglass heater utilizing primarily radiative heating with convective cooling air driven by a shaded-pole fan motor. U.S. Pat. No. 4,054,376, to Wareham, entitled Method and Apparatus for Heating Eyeglass Frames, discloses a forced air eyeglass heating device with temperature control. The heated air is blown through heat retentive beads in which the eyeglass frames are immersed. U.S. Pat. No. 5,286,951, to Jones, entitled Acetate Spectacle Frame Bridge Adjuster, also discloses a glass-bead heating medium.

U.S. Pat. No. 4,567,676, to Conti, entitled Double-Jet, Hot-air Generator for Spectacle Frames, purports to disclose fan speed, heat quantity control and hot air temperature. However, such controls are rudimentary and lack feedback, to the extent they are disclosed at all.

Additionally, while phase-locked loop feedback control systems are generally not new in the art, their use in eyeglass heaters is considered new. For example, U.S. Pat. No. 4,348,625 to Sharp, entitled Variable Speed Motor System, discloses a speed control for a shaded-pole single phase induction motor using a phased-locked loop and tachometer feedback system; however, there is no suggestion of using such a system in combination with a heat sink eyeglass heater housing. Similarly, U.S. Pat. No. 4,658,692, to Bagus, entitled Control Circuit for Shaded-Pole Motor, lacks disclosure relating to fan motor use and a heat sink housing.

SUMMARY OF THE INVENTION
(DISCLOSURE OF THE INVENTION)

The present invention is of an eyeglass heater comprising: a fan motor comprising a single phase induction motor; a heater comprising a plurality of heater coils; a circuit comprising circuitry components for controlling the fan motor and heater; and a heat-conductive housing enclosing the fan motor, heater, and circuit. In the preferred embodiment, the fan motor, the heater, and the circuit are configured vertically upon and symmetrically about a central vertical axis of the housing. The fan motor preferably comprises a fan generating an upwardly spiraling air mass adjacent the housing and about the central vertical axis. The heater preferably comprises a plurality of heater coils. The circuit board preferably comprises a fan motor speed controller with a phase-locked loop feedback circuit and a fan motor speed sensor (optical chopper, Hall effect system, or a relatively rotatable magnet and coil) and a heater controller with a phase-locked loop feedback circuit and a heat sensor (thermistor). The heat-conductive housing preferably comprises a plurality of opposed air outlets for exhausting the upwardly spiraling air mass and a light beam generator targeting the space between the opposed air outlets (interruption of the light beam by a workpiece initiates operation of the eyeglass heater).

The invention is also of a method and apparatus for maintaining a flowing air mass at a preselected temperature comprising: heating a flowing air to a preselected temperature; sensing an actual temperature of the flowing air mass; determining the difference between the actual temperature and the preselected temperature; and automatically reducing the difference. In the preferred embodiment, heating the flowing air mass to a preselected temperature comprises heating a plurality of hollow Nichrome™ (trademark of Driver-Harris Company) heater coils. Preferably, heating a flowing air mass to the preselected temperature comprises employing a heat-conductive housing with opposed air outlets, sensing the actual temperature of the flowing air mass comprises employing a thermistor, and determining the temperature difference and automatically reducing the temperature difference comprise employing a phase-locked loop feedback circuit.

The invention further comprises a method and apparatus for controlling air mass flow comprising: generating a preselected volume of air flow per unit time; employing a signal proportional to the actual volume of air flow per unit time; determining a difference between the actual volume of air flow per unit time and the preselected volume of air flow per unit time; and automatically reducing the volume difference. In the preferred embodiment, generating a preselected volume of air flow per unit time comprises employing a fan motor, employing a signal proportional to the actual volume of air flow per unit time comprises employing a tachometer, determining the difference between the actual volume of air flow per unit time and the preselected volume of air flow per unit time and automatically reducing the volume difference comprise employing a phase-locked loop feedback circuit, and generating a preselected volume of air flow per unit time comprises employing a heat-conductive housing with opposed air outlets.

The present invention is additionally of an eyeglass heater comprising: a fan motor for generating a flowing air mass; a heater for heating the flowing air mass; and a phase-locked loop feedback circuit for controlling both the fan motor and the heater. Preferably, the heater further comprises a heat-conductive housing enclosing the fan motor, the heater, and the phase-locked loop feedback circuit, the housing preferably with a plurality of opposed air outlets and a light beam for initiating operation of the eyeglass frame heater, as well as a plurality of control settings, such as for run-time setting, air volume per unit time setting, temperature setting, and a cool air switch.

The invention is further of a heater element comprising: a pyramidal support structure; a strip surrounding and attached to a base of the support structure; and a heating coil attached to the support structure. The element preferably further comprises a fuse electrically connected to the heating coil and a screen (aluminum) attached to a bottom of the strip and protecting against physical access through the bottom of the strip to the heating coil. The pyramidal support structure preferably comprises a pair of substantially triangular mica support elements connected to form an "X" shape when viewed from above. The strip is preferably steel and the heating coil Nichrome™ wire.

A primary object of the present invention is the provision of a phase-locked loop feedback heater control circuitry;

Another object of the invention is the provision of a phase-locked loop feedback fan motor control circuitry;

Still another object of the invention is the provision of an opposed air outlet heater housing providing a heat sink;

Yet another object of the invention is the provision of low mass series-connected heater elements proximate the housing air outlets;

Another object of the invention is the provision of an air flow path providing circular air flow proximate the inner periphery of the housing;

A primary advantage of the invention is that temperature of the air flow is constant regardless of the volume of air flowing over the heating elements.

An additional advantage of the invention is its greater heating and power consumption efficiency;

Another advantage of the present invention is its integral air outlet and heat sink structure;

Yet another advantage of the invention is the provision of temperature stability of ±5° F. with power fluctuations;

Still another advantage of the invention is operator safety provided by the unique air flow and heat conductive housing structure.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
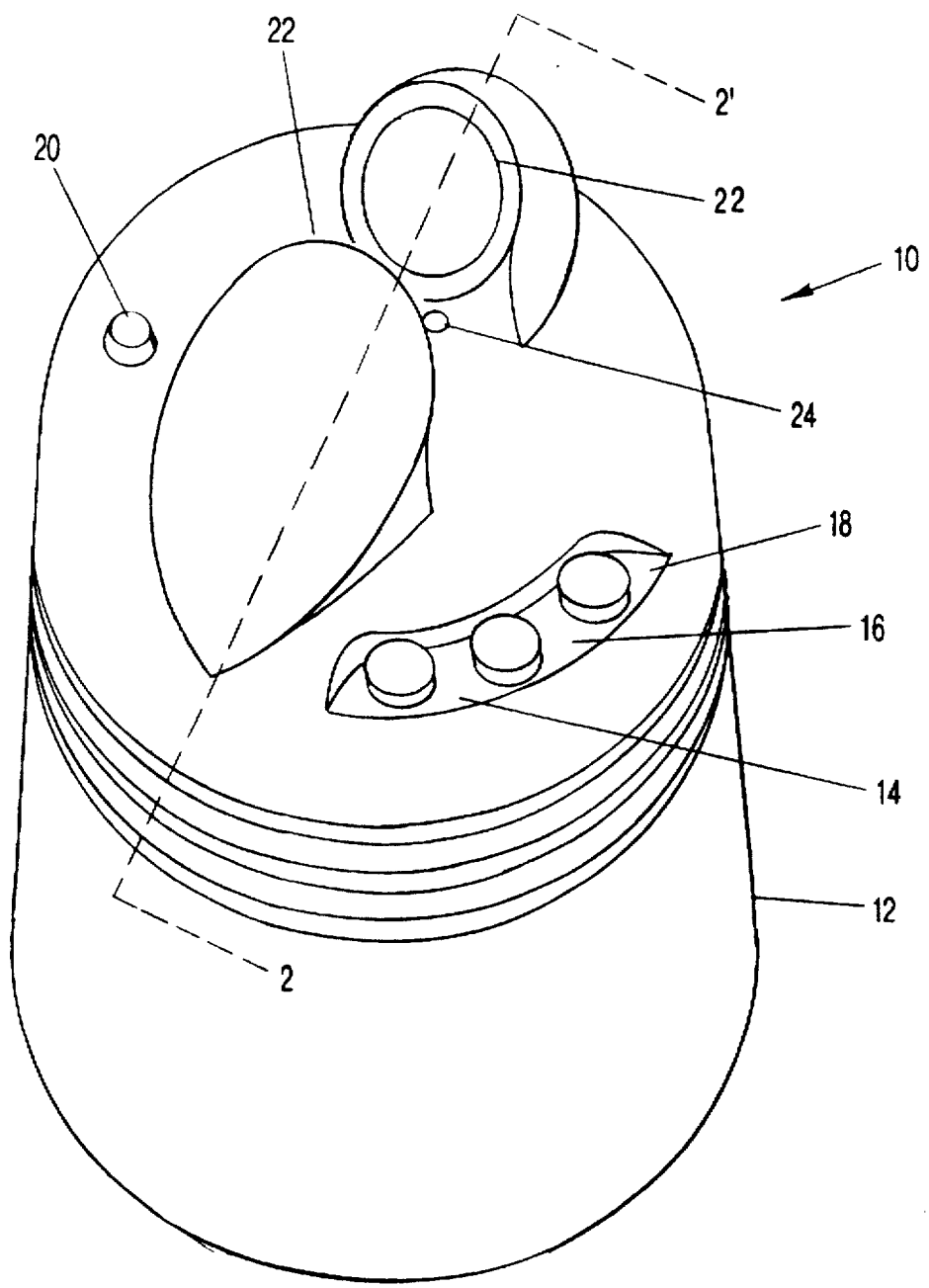
FIG. 1 is a perspective view of the eyeglass heater of the invention.

FIG. 1 shows an external perspective view of the preferred eyeglass frame heater 10 of the present invention. Housing 12 serves both as a support for all components as well as a heat sink. Accordingly, housing 12 preferably comprises a good heat conductor, including, but not limited to aluminum, copper, silver, gold or alloys thereof.

Housing 12 also serves to meet the various control knobs. Temperature adjustment knob 14, air volume adjustment knob 18 and run time knob 16 (optional) are mounted at the top of housing 12 for ease of manipulation. Cool air switch 20 and opposed air outlets 22 are also mounted upon the top of housing 12. Start switch 24 comprises axially opposed light beam-linked optical elements that initiate heating when eyeglass frames are inserted between the elements, thereby interrupting the light beam and initiating operation.

Figure 2:
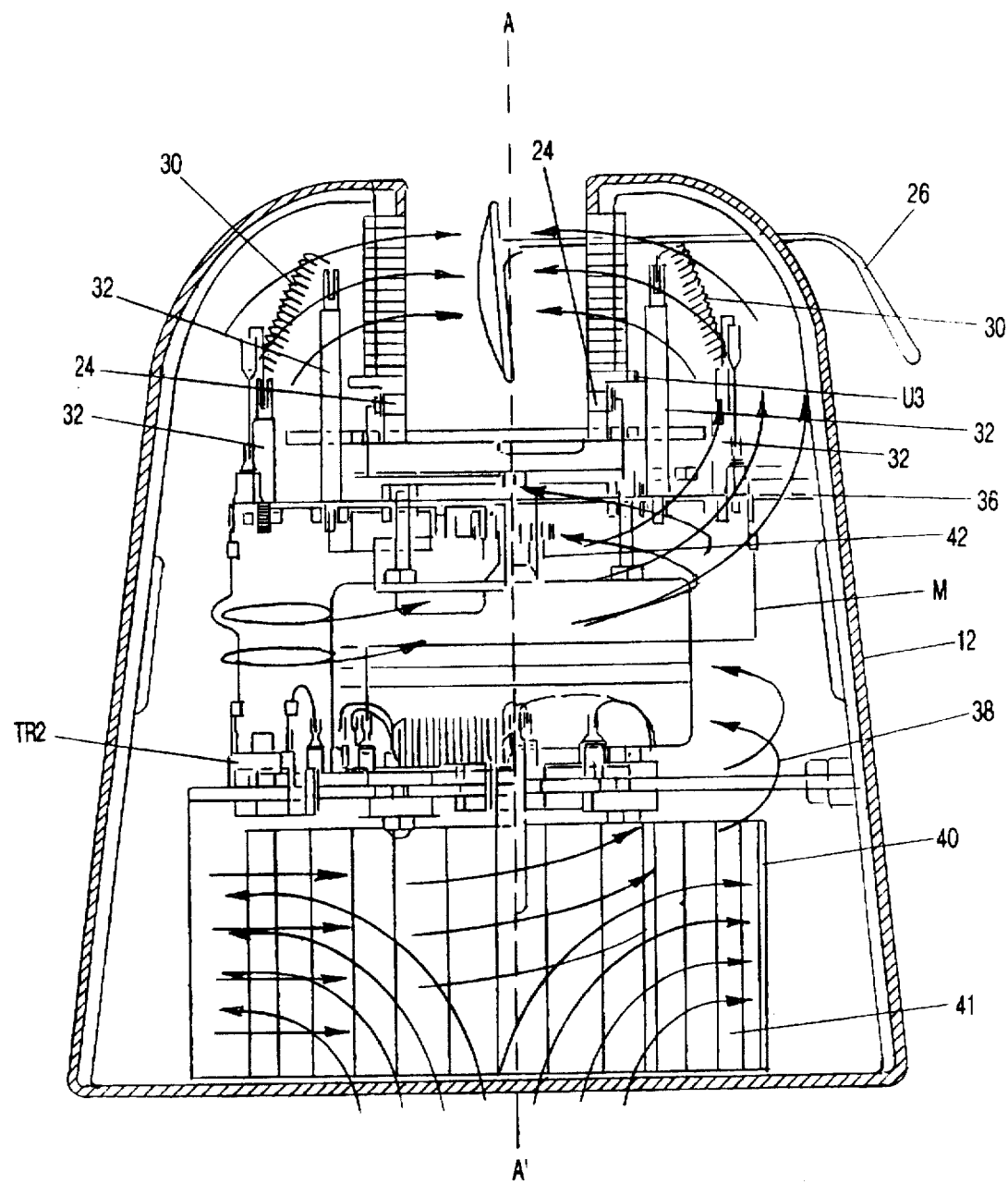
FIG. 2 is a sectional view taken along line 2–2' of FIG. 1.

FIG. 2 is a sectional view of the invention along line 2–2', showing the inner structural configuration of the invention. As described above, insertion or placement of eyeglass frames 26 between optical elements 24 interrupts the light beam therebetween, initiating operation. Immediately following such "start" operation, motor M starts, followed by heater energization.

Figure 2A:
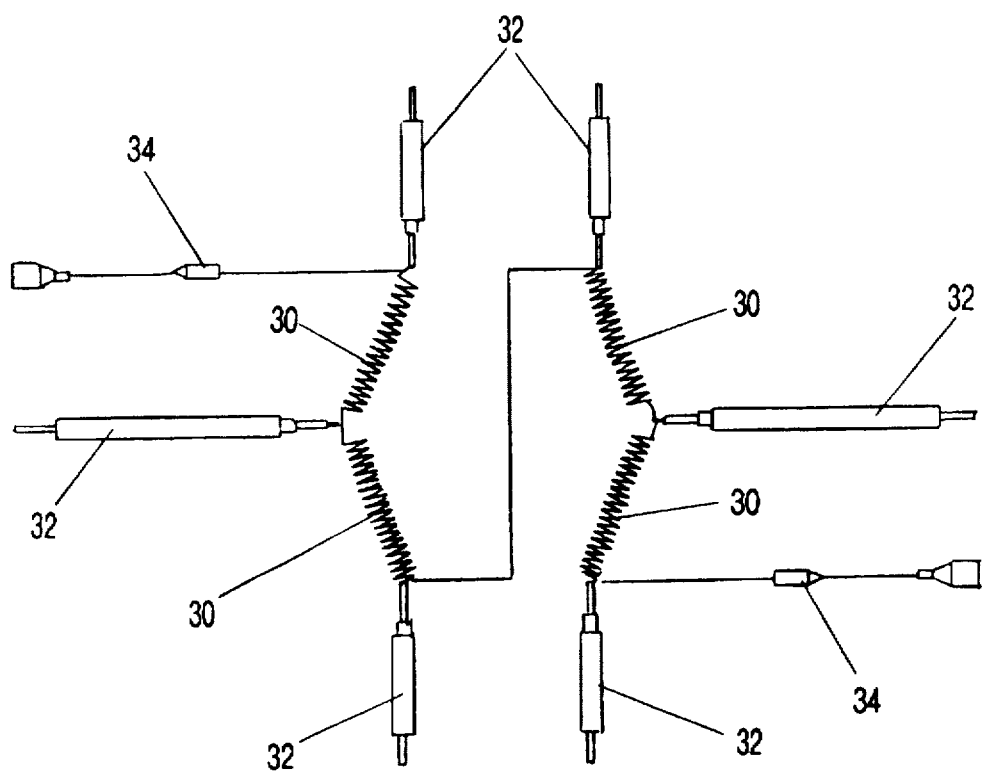
FIG. 2a is a schematic drawing of the heater coils and supports of the invention.

Heater coil 30 preferably comprises Nichrome™ wire. Coils 30, are series-connected, as shown in FIG. 2a. The heater coil harness further comprises supports 32 and fuses 34, as necessary. Supports 32 are secured to circuit board 36, thereby positioning heater coils 30 in close proximity and within opposed air outlets 22.

Placement of heater coils 30 proximate and within air outlets 22 enables effective use of low mass hollow Nichrome™ heater coils 30. Placement of thermistor U3 in an air outlet 22 permits rapid temperature sensing for heater temperature control, as will be developed later.

Circuit board 36 comprises the circuitry components for speed control of motor M and temperature control of heater coils 30. Circuit board 36 is centered about axis A–A', as are all the vertically configured components of the invention.

With the exception of motor M, and heater triac TR2, all circuitry elements are mounted on board 36.

Motor M, preferably a four-pole fractional horsepower shaded-pole induction motor is securely mounted upon motor support plate 38. Motor support plate 38 is, in turn, cantilever-mounted upon frame 12.

Fan 40, comprising radially extending fan blades 41, is mounted axially below motor 28 upon the shaft of motor 28. In operation, ambient air enters through air inlet ports (not shown) at the bottom of housing 12, and is circulated outwardly and upwardly in a spiral air mass (as shown by arrows). Heat transfer occurs between such air mass and housing 12 as well as conductively between hotter and cooler housing areas; the air mass splits and is diverted through each in outlet 22.

Power Supply

Figure 3:
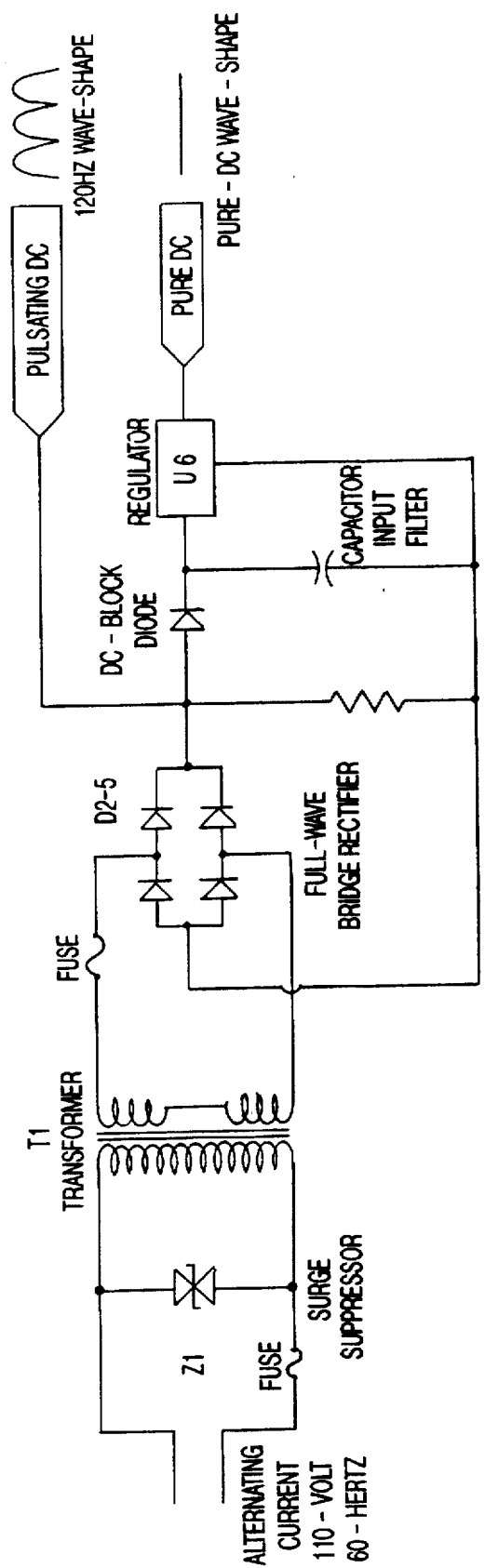
FIG. 3 is a simplified schematic diagram of the power supply of the invention.

The power supply of the preferred embodiment of the invention comprises pure DC, pulsed DC and AC, as shown schematically in FIG. 3.

Household AC is transformed by T1 to 12V, 500 ma AC. Full wave rectifier D2-5 outputs 120 Hz pulsed DC, applied to the collectors of Darlingtons Q2 and Q4.

Filtered (or "pure") DC is supplied to programmable U5T's Q1 and Q3 as well as variable resistances chopper U2, VR1 and VR3. AC is applied to the load devices, via triacs TR1 and TR2, namely motor M and heater coils 30.

Motor Control

Figure 4:
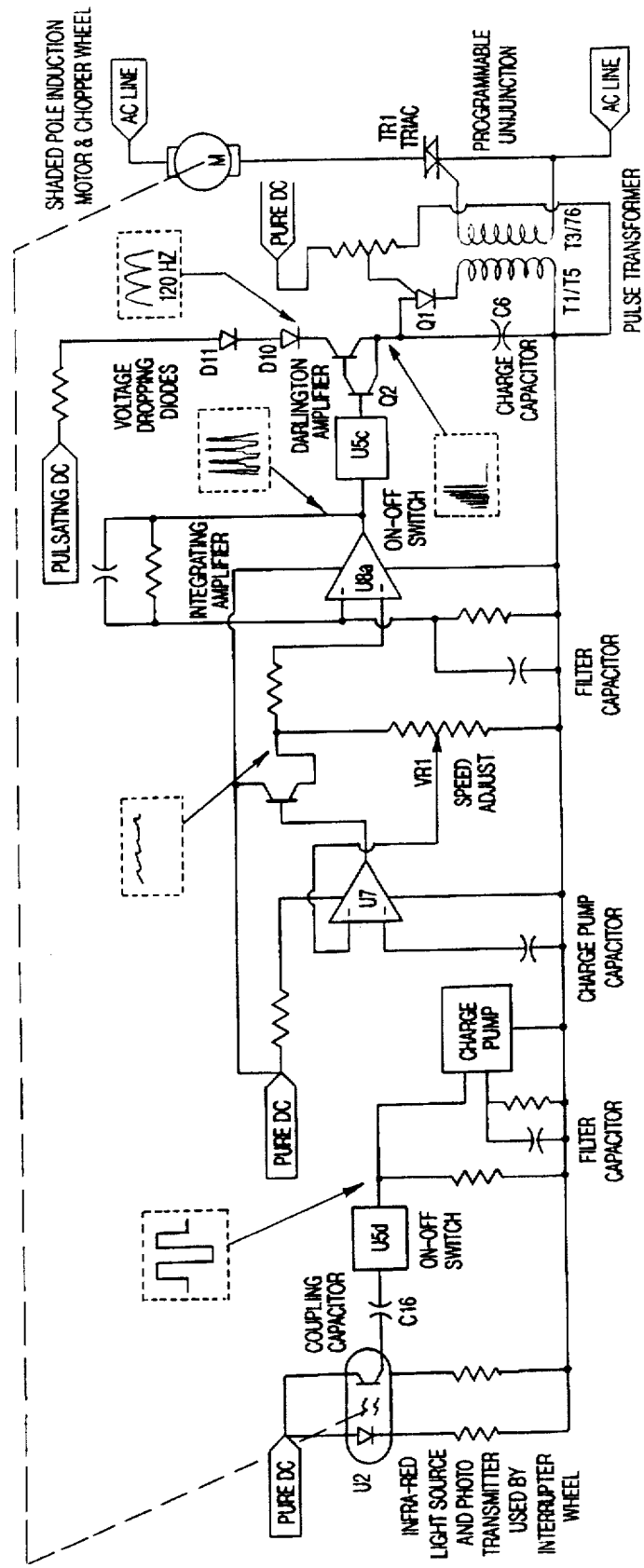
FIG. 4 is a simplified schematic diagram of the fan motor control circuitry of the invention.

FIG. 4 depicts a simplified schematic diagram of the motor control circuitry employed in the preferred embodiment of the invention. Motor M, preferably a four-pole shaded pole induction motor, mounts the chopper wheel for optical chopper U2 on its shaft. Light pulses are converted to electric pulses and connected through FET switch U5d to the charge pump (an integrating and a timing capacitor) to provide a control voltage to one input of operational amplifier U7. The other input to operational amplifier U7 is connected to the output of U7 through an emitter follower and variable resistance network VR1 that function as a speed adjustment and setting, set by control knob 16. The output of the emitter follower connects to one input of integrating amplifier U8a; the other input to integrating amplifier U8a is connected to the output of integrating amplifier U8a through a feedback network and a filter capacitor. The output of integrating amplifier U8a is also connected to the base of Darlington amplifier Q2 through FET switch U5c.

In operation, the output of integrating amplifier U8a controls the bias of the base of the Darlington amplifier, thereby allowing (and restricting) 120 Hz positive pulses from the power supply to charge capacitor C1. The charging current also renders the programmable U5T Q1 conductive, thereby dumping capacitor C1 through primary winding T3-1/T3-5. The resulting pulse in secondary winding T3-3/T3-6 fires triac TR1, conducting AC current through the motor M primary. Programmable U5T Q1 is then turned off and reset by the pulsating DC through the Darlington Q2.

Phase angle modulation occurs when motor load increases or decreases, thereby changing rotational speed of motor M, also changing the number of pulses sensed by chopper U2. DC levels of the integrator components will vary, causing triac TR to conduct earlier or later in the cycle. For example, if the load is sharply decreased, the integrating components inhibit the Darlington amplifier Q2 from conducting until motor speed again reaches the value demanded by the setting of variable resistor VR1. The resulting "correct" pulse rate of chopper U2 will vary the bias on Darlington Q2 to start pulses at each half cycle, thereby minimizing loop overshoot.

By increasing the speed setting by changing the setting of variable resistor VR1 (by control knob 16), the integrating components behave as operational amplifiers, providing a demand voltage to Darlington Q2, thereby allowing a higher voltage to render triac TR conductive earlier in the half cycle. More overall current is provided to the motor, increasing torque and rotational speed. When rotational speed corresponds to the preset speed control setting (or maximum rotational speed), the integrator components will then vary the Darlington bias to provide the "correct" amount of current in each half cycle to maintain the torque that will sustain that particular motor speed.

Since motor current is dependent upon load, less overall average current is required with the present invention and less motor heat is dissipated. Energy savings are concomitantly greater.

Those ordinarily skilled in the art will recognize that other feedback schemes can be incorporated in the preferred embodiment of the invention. For example, a relatively rotational coil-and-magnet system producing speed-dependent pulses could be utilized, as well as a Hall effect speed sensor. Other rotational sensing or tachometer configurations could include a blocking oscillator configuration or various other magnetic saturation devices.

It should be recognized that a given motor speed concomitantly "pumps" a given volume of air per unit time through air outlets 22. Increasing motor speed increases volume of air passage and vice versa.

Heater Control

Figure 5:
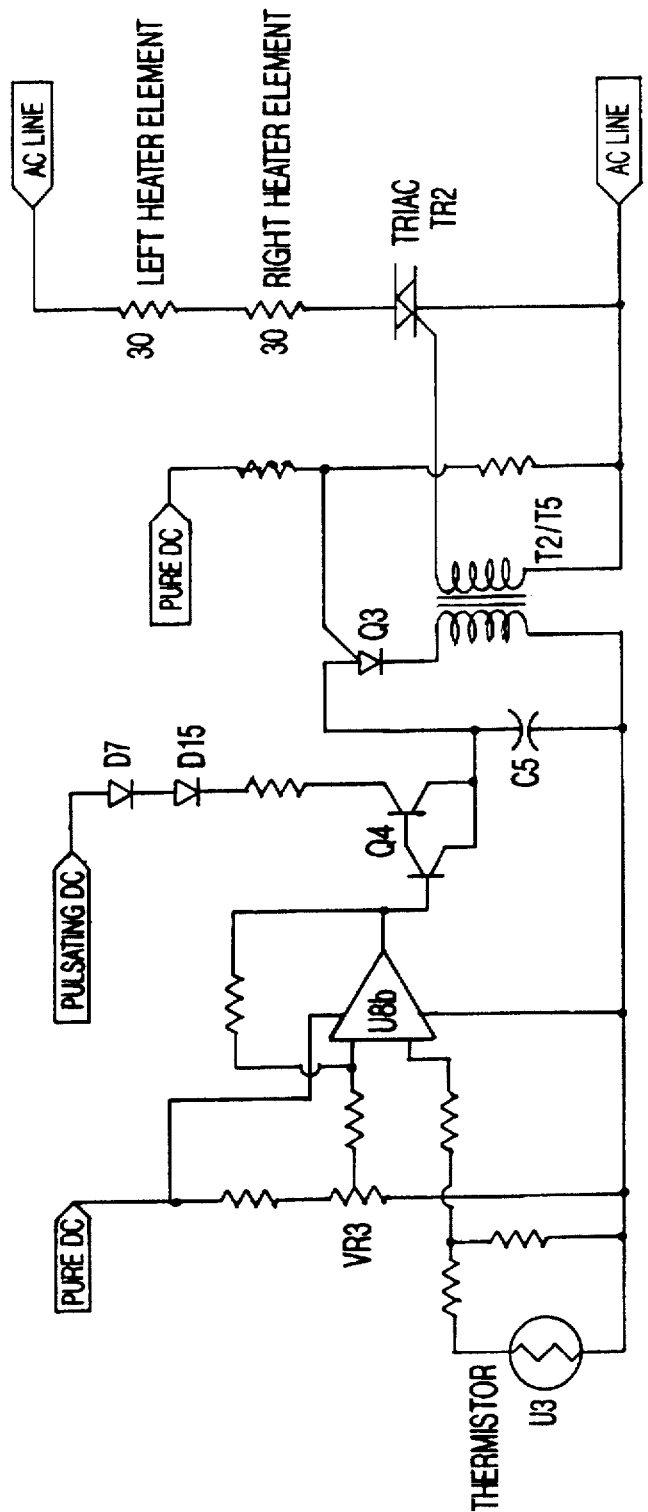
FIG. 5 is a simplified schematic diagram of the heater control circuitry of the invention.

FIG. 5 depicts a simplified schematic diagram of the preferred phase angle modulation temperature control circuitry of the invention.

Initially the desired air temperature is preset via control knob 14, thereby setting variable resistance VR3. VR3, in turn, inputs a signal indicative of the desired air temperature to operational amplifier U8b.

Thermistor U3 in one of air outlets 22 senses the actual temperature of the outlet air stream and charges its resistance and the input to operational amplifier U8b, accordingly. Operational amplifier U8b amplifies this signal and applies it to the base of Darlington amplifier Q4.

Darlington amplifier Q4 thereby conducts periodically, charging capacitor C5. When the charge on capacitor C5 exceeds the gate bias voltage of programmable U5T Q3, Q3 conducts and dumps capacitor C5 through the transformer. The pulse induced in secondary winding T2-2/T2-5 renders triac TR2 conductive earlier or later in the half cycle, conducting AC through serially connected Nichrome™ heater coils 30.

The phase control network presented by this circuit provides extremely accurate temperature control as well as saving considerable energy expenditure.

Timing Circuits

Figure 6:
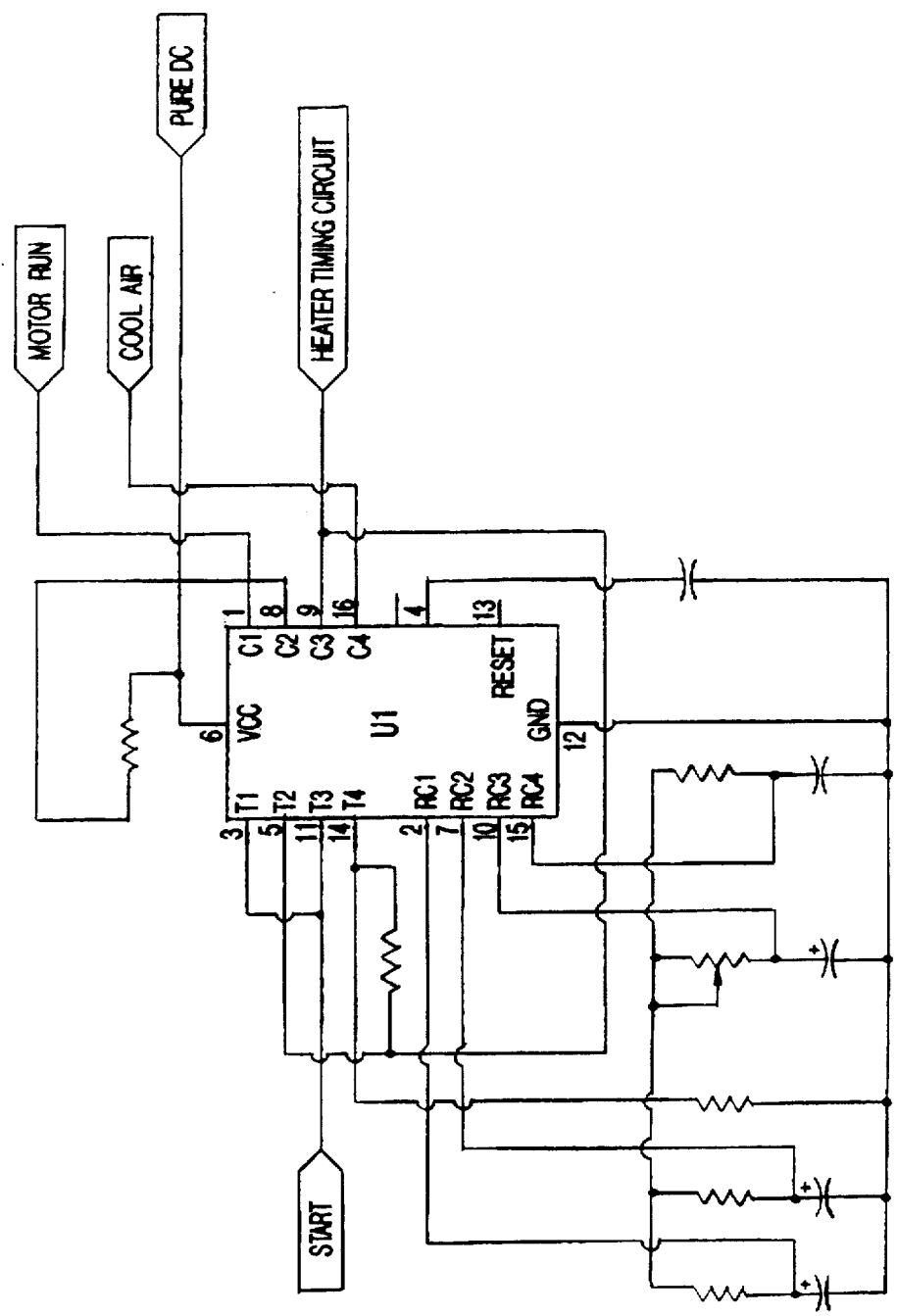
FIG. 6 is a simplified schematic diagram of the timing circuits of the invention.

FIG. 6 shows a simplified schematic diagram of the timing circuits used in the invention. As disclosed previously, insertion of eyeglass frames between the air outlets breaks the light beam and initiates "start" of the apparatus. Motor M starts immediately, followed by heater 30 energization. "Run time" set by knob 16 (optional; may be replaced by an indicator that the unit is in operation) sets the time of operation and time for heater 30 energization. Upon the expiration of "run time", motor M accelerates to maximum speed for 10–12 seconds, permitting cooling of the eyeglass frames and air outlets. Similarly, actuation of cool air switch control knob 20 overrides "run time", terminates heating, and accelerates the motor M to maximum speed for 10–21 seconds.

Figure 7:
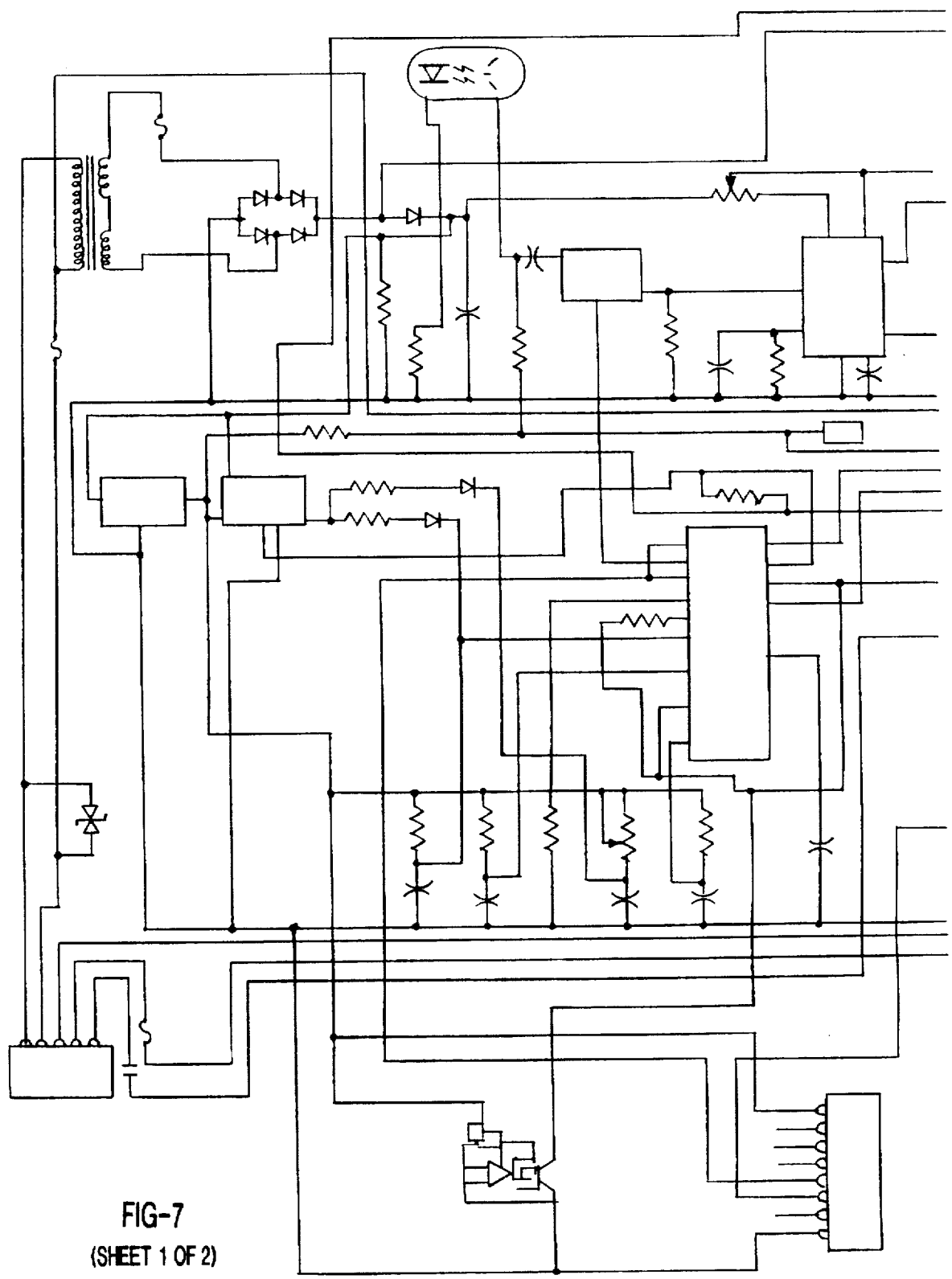
FIG. 7 is a detailed schematic of electrical components comprising the invention.
Figure 7:
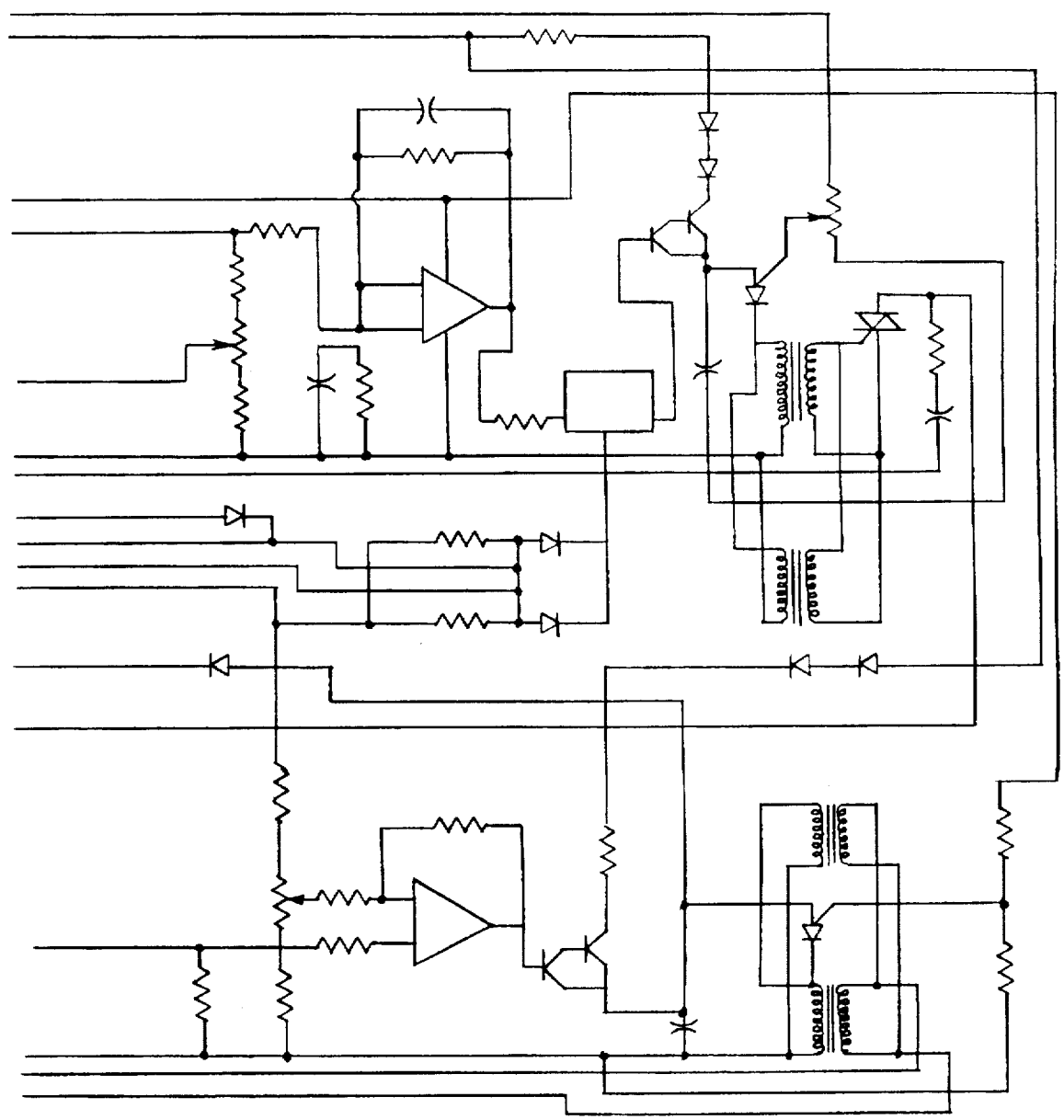
Figure 7:
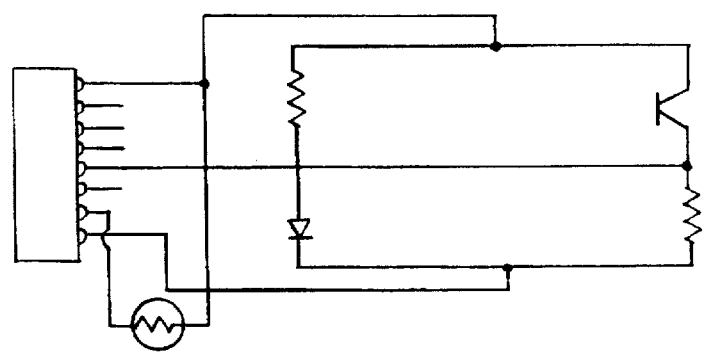
Figure 8:
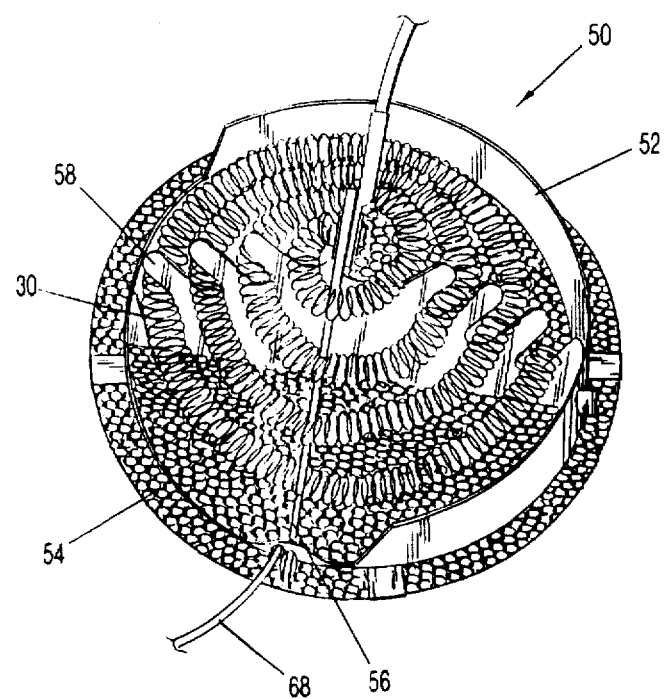
FIG. 8 is a front perspective view of an alternate heater coil and support of the invention.
Figure 9:
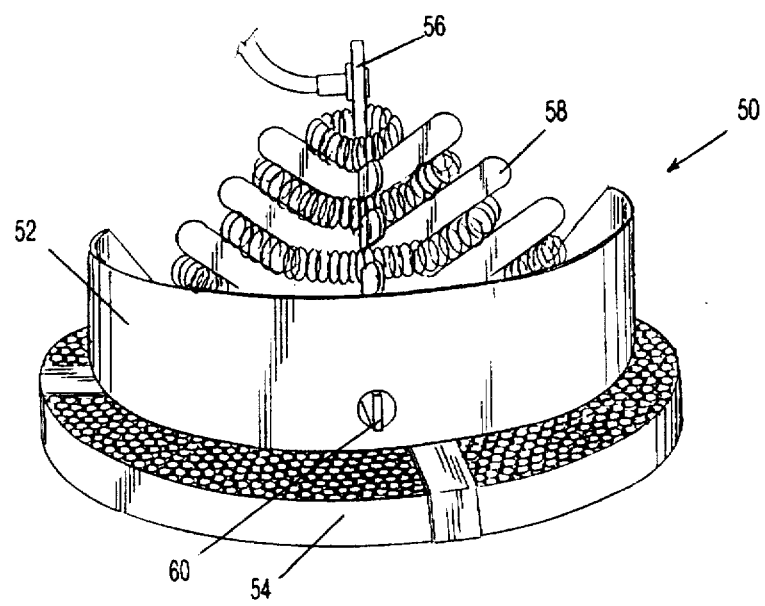
FIG. 9 is a rear perspective view of the alternate heater coil and support of the invention.
Figure 10:
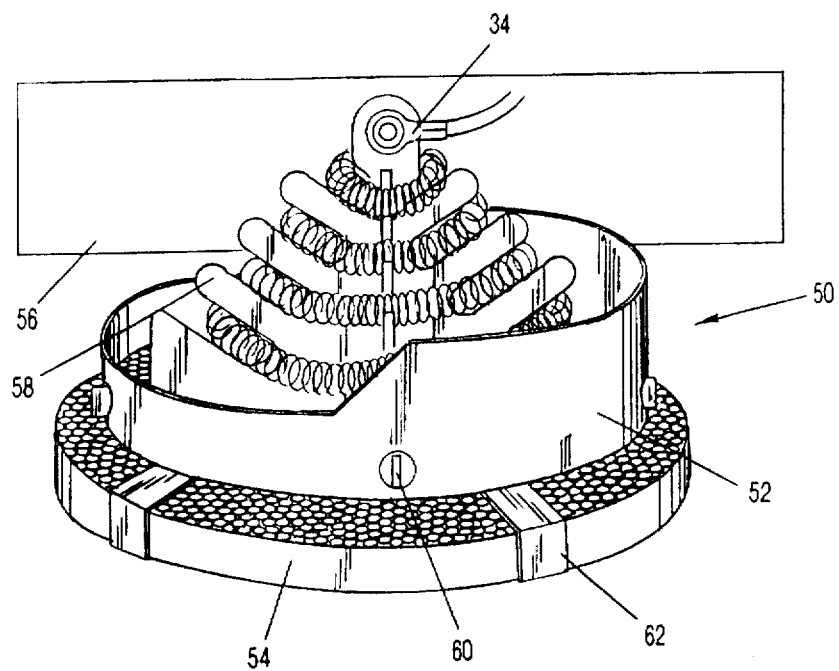
FIG. 10 is a first side perspective view of the alternate heater coil and support of the invention.
Figure 11:
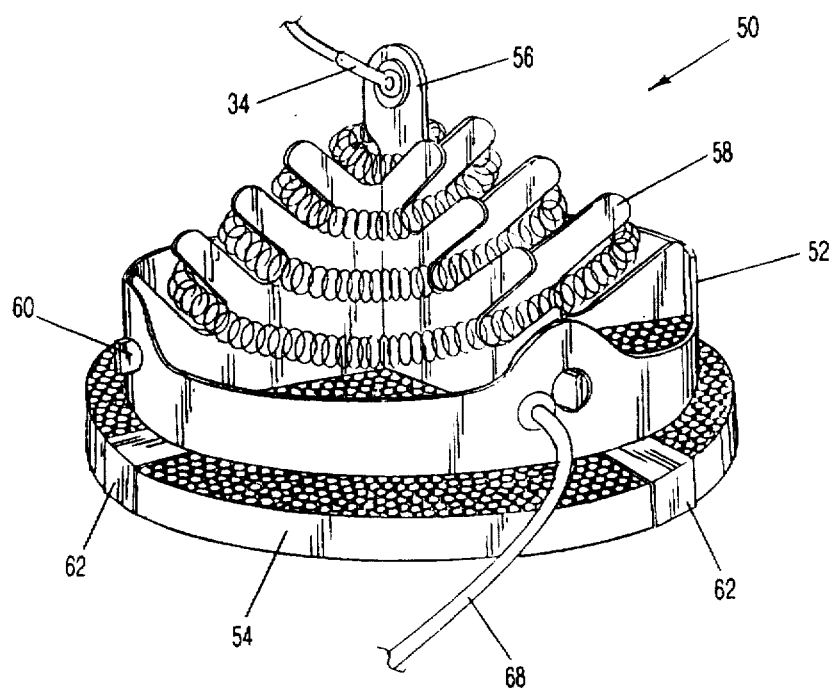
FIG. 11 is a second side perspective view of the alternate heater coil and support of the invention.

Timer chip U1, as shown in FIG. 6, further comprises the various R-C timing circuits connected thereto. FIG. 7 shows a detailed schematic of the actual circuitry components employed in the preferred mode of the invention. All components are standard "off the shelf" components thereby simplifying repair and/or replacement of parts.

Alternate Heating Elements

Figure 12:
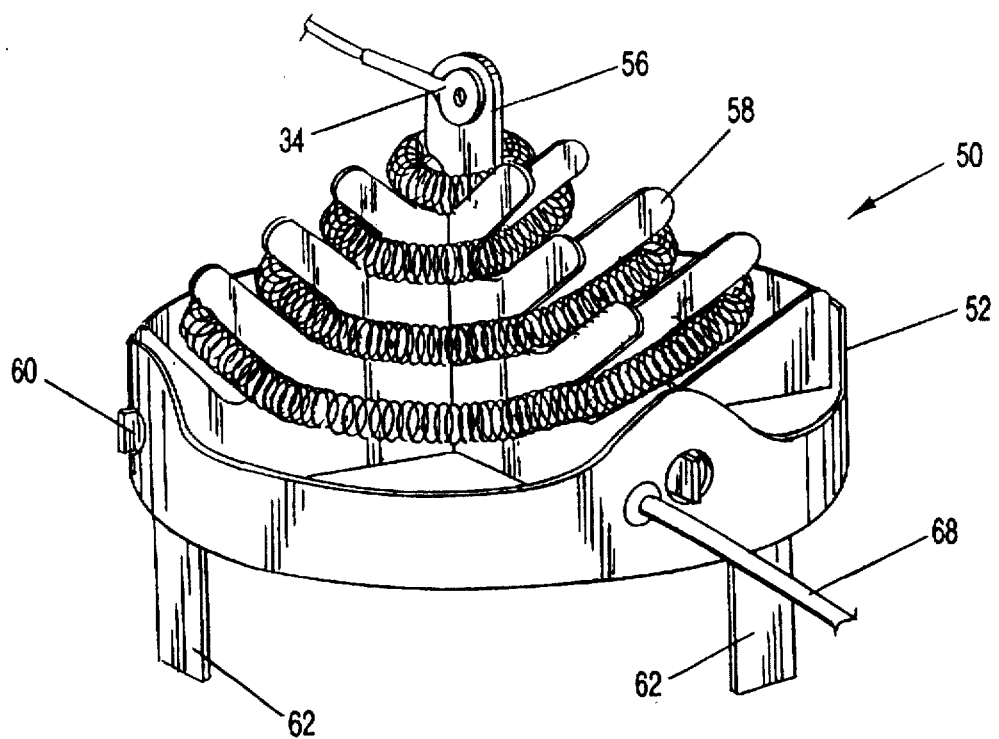
FIG. 12 is a second side perspective view of the alternate heater coil and support of the invention prior to installation of a grill.
Figure 13:
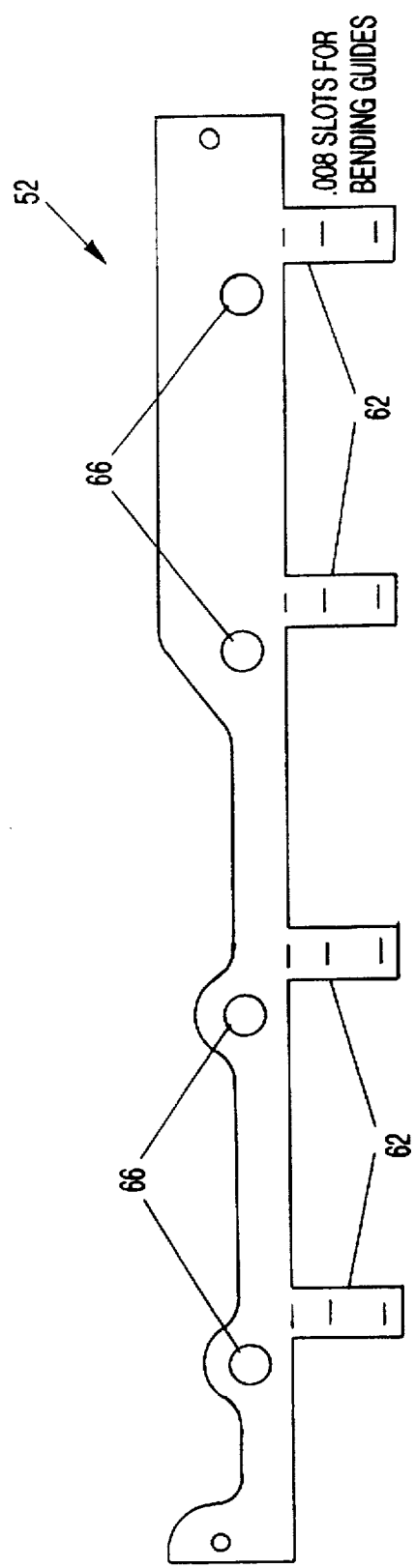
FIG. 13 is a plan view of the steel band of the alternate heater coil and support.
Figure 15:
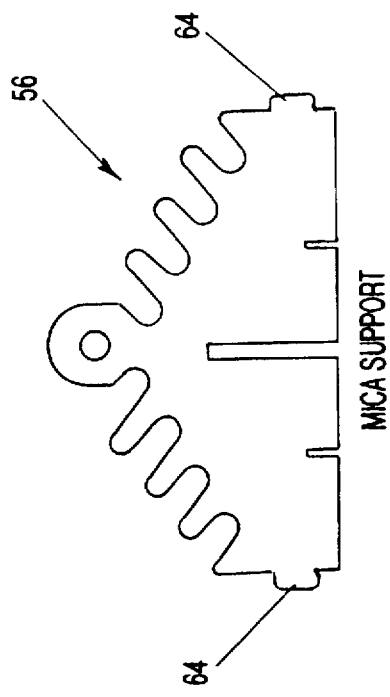
FIG. 15 is a plan view of the second mica support of the alternate heater coil and support.
Figure 14:
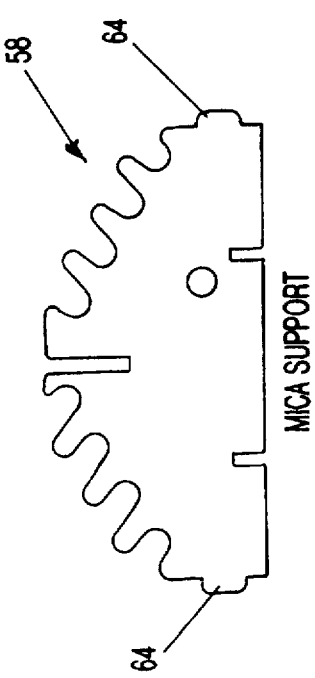
FIG. 14 is a plan view of the first mica support of the alternate heater coil and support.

FIGS. 8–11 illustrate the alternate heating elements 50 of the invention. Each comprises grill 54 (preferably an aluminum hexagonal cellular structure) attached to strip 52 (preferably steel) by tabs 62, supports 56 and 58 (preferably mica) connected to each other in a pyramidal perpendicular orientation and to strip 52 by tabs 64, coil 30 (preferably of Nichrome™ wire), and fuse 34. FIG. 12 shows the heating element prior to attachment to grill 54. FIGS. 14 and 15 illustrate the preferred supports of the alternate heating element, and FIG. 13 the preferred strip.

Figure 16:
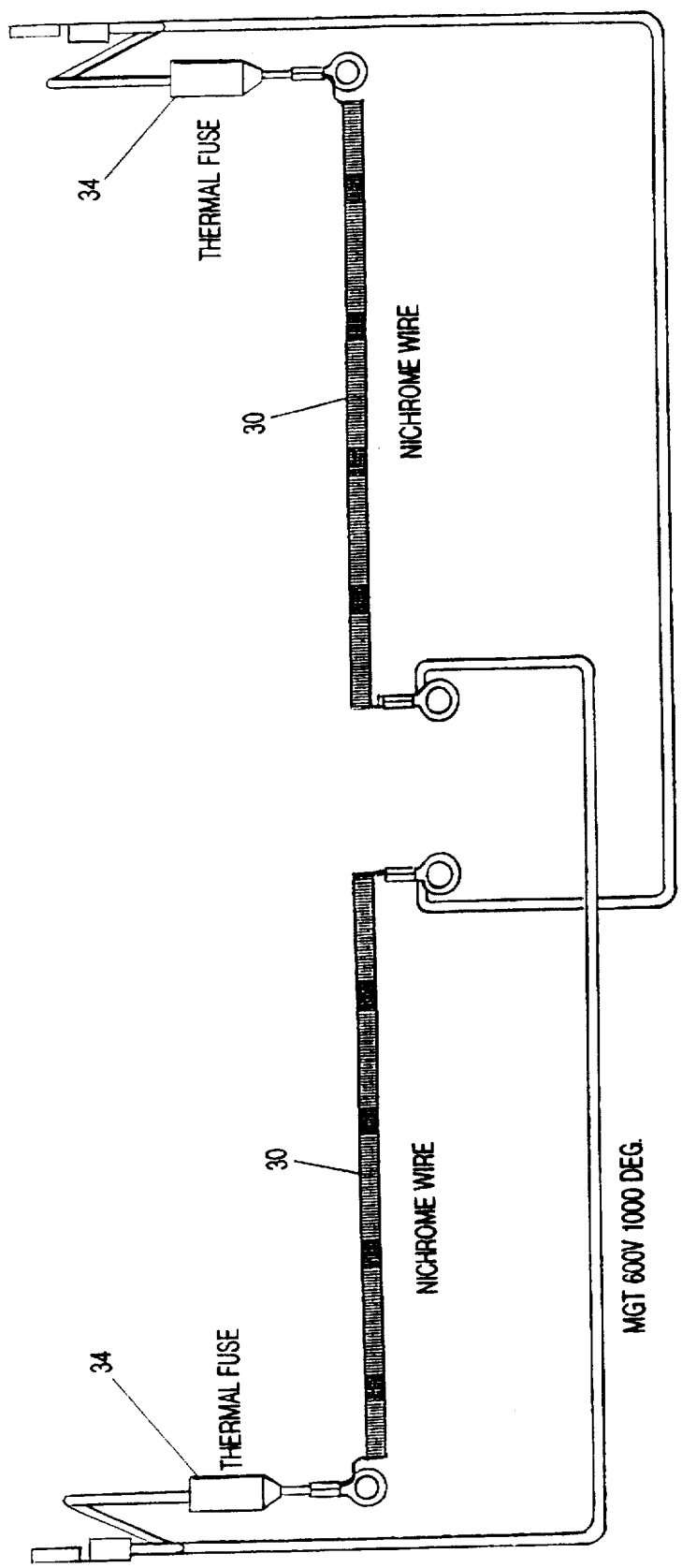
FIG. 16 is a plan view of the wire assembly of the alternate heater coil and support.
Figure 17:
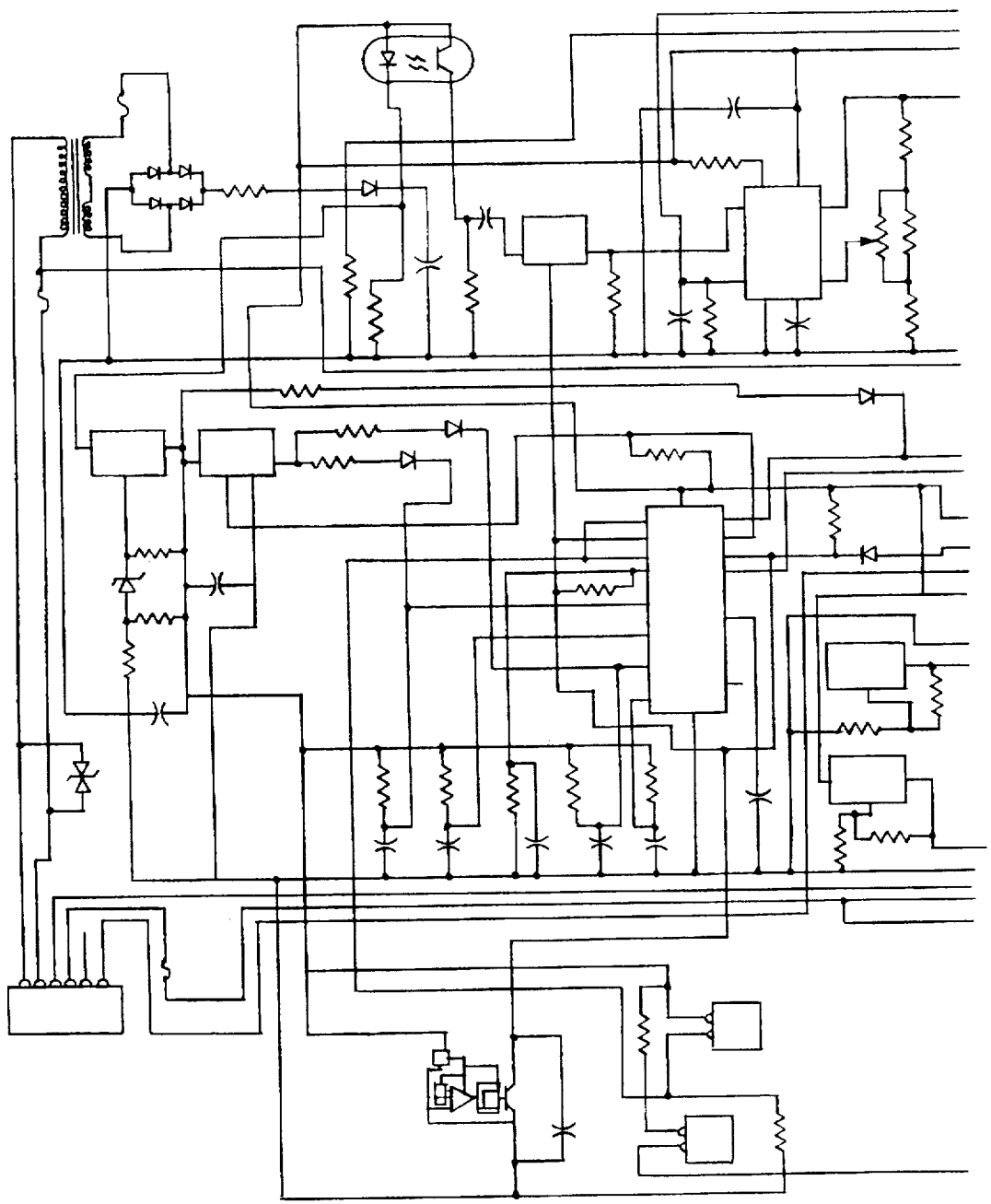
FIG. 17 is a detailed schematic of the electrical components comprising the invention preferred with the alternate heater coil and support.
Figure 17:
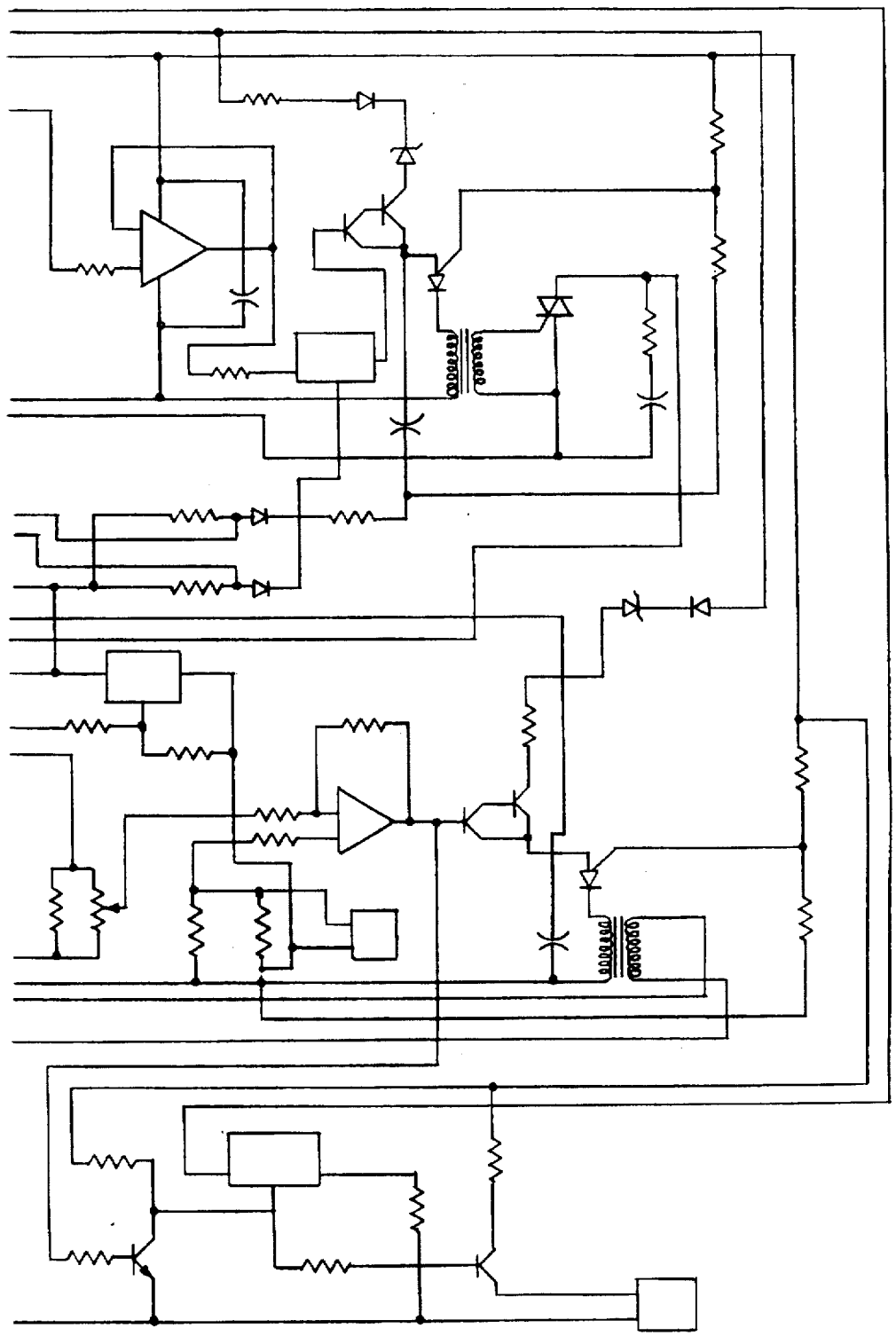

Assembly of the preferred alternate heating element is as follows. Mica (preferably 0.062 mica) is cut by laser to the two configurations of FIGS. 14 and 15. Support 56 is then slid on top of support 58 to form an "X" when viewed from above. The supports are held in this shape by the steel strip of FIG. 16 which is rolled into a circle and has the supports placed inside with tabs 64 engaging holes 66 in the strip. Tabs 62 on the bottom of the strip are partially slit by laser to facilitate bending. Tabs 62 hold grill 54 that will reduce airflow less than five percent but provide a safety factor in that the cells are 0.062 in diameter and have a length of 0.25, making it extremely difficult to access the hot portions of the elements. The shape of the strip is determined by the angle that the air flow has when approaching the heater element. If the air flow does not flow across all of the coil evenly then the coil will overheat and deform, possibly drooping and shorting to the steel strip.

Behind each heater element is a thermal fuse attached to the element and positioned in such a way as to be cooled by the ambient air flow. Should the ambient air flow be interrupted and the heaters allowed to heat the temperature in the housing, air outlets will rise and the thermal fuse will open the circuit, causing the heating elements to shut down and cool off.

Wire 30 is preferably made of Nichrome™ wire formed into a coil and then stretched into a coil that will wind around the supports once the supports are formed into the "X" shape. The end of the wire is attached (preferably riveted) to the support along with the thermal fuse. The other end of the wire is attached to the lower portion of the support along with the wire 68 that completes the circuit.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, patents, and publications cited above are hereby incorporated by reference.

What is claimed is:

1. An eyeglass heater apparatus comprising:
   a fan motor comprising a single phase induction motor;
   a heater comprising a plurality of heater coils;
   a control circuit comprising means for controlling said fan motor and said heater, said means for controlling said fan motor comprising a phase-locked loop feedback circuit for controlling the speed of said fan motor, said control circuit operably connected to said fan motor and said heater; and
   a heat-conductive housing enclosing said fan motor, said heater and said control circuit.

2. The apparatus of claim 1 wherein said fan motor, said heater, and said control circuit are configured vertically upon and symmetrically about a central vertical axis of said housing.

3. The apparatus of claim 2 wherein said fan motor comprises a fan for generating an upwardly spiraling air mass adjacent said housing and about said central vertical axis.

4. The apparatus of claim 1 further comprising means for sensing fan motor speed, said sensing means operably connected to said control circuit.

5. The apparatus of claim 4 wherein said speed sensing means comprises an optical chopper.

6. The apparatus of claim 4 wherein said speed sensing means comprises a Hall effect system.

7. The apparatus of claim 4 wherein said speed sensing means comprises a relatively rotatable magnet and coil.

8. The apparatus of claim 3 wherein an exhaust temperature of said air mass remains substantially constant as volume of said air mass fluctuates.

9. The apparatus of claim 3 wherein said heat-conductive housing comprises a plurality of opposed air outlets for exhausting said upwardly spiraling air mass.

10. The apparatus of claim 9 further comprising means for generating a light beam between said opposed air outlets.

11. The apparatus of claim 10 wherein interruption of said light beam by a workpiece initiates operation of said eyeglass heater apparatus.

12. The apparatus of claim 1 wherein said means for controlling said heater comprises a phase-locked loop feedback circuit.

13. The apparatus of claim 12 wherein said phase-locked loop feedback circuit comprises means for heat sensing.

14. The apparatus of claim 13 wherein said heat sensing means comprises a thermistor.

15. An apparatus for maintaining a flowing air mass at a preselected temperature comprising:
    a heater for heating a flowing air mass to a preselected temperature;
    a sensor for sensing an actual temperature of said flowing air mass;
    means for determining the difference between said actual temperature and said preselected temperature; and
    means for automatically reducing said difference; and
    wherein said means for determining said temperature difference and said means for automatically reducing said difference comprise phase-locked loop feedback means.

16. The apparatus of claim 15 wherein said heater for heating a flowing air mass to a preselected temperature comprises a heater coil.

17. The apparatus of claim 16 wherein said heater coil comprises a plurality of hollow heater coils.

18. The apparatus of claim 16 wherein said heater coil comprises a Nichrome™ heater coil.

19. The apparatus of claim 15 wherein said heater for heating a flowing air mass to a preselected temperature comprises a heat-conductive housing.

20. The apparatus of claim 19 wherein said housing comprises opposed air outlets.

21. The apparatus of claim 20 wherein said heater for heating a flowing air mass to a preselected temperature and said sensor for sensing the actual temperature of said flowing air mass are mounted proximate said air outlets.

22. The invention of claim 15 wherein said sensor for sensing said actual temperature comprises a thermistor.

23. A method for maintaining a flowing air mass at a preselected temperature, the method comprising the steps of:
    a) heating a flowing air mass to a preselected temperature;
    b) sensing an actual temperature of the flowing air mass;
    c) determining the difference between the actual temperature and the preselected temperature; and
    d) automatically reducing the difference; and
    wherein the steps of determining the temperature difference and automatically reducing the temperature difference comprise providing a phase-locked loop feedback circuit.

24. The method of claim 23 wherein the step of heating the flowing air mass to a preselected temperature comprises the step of providing energy to heater coils.

25. The method of claim 24 wherein the step of heating heater coils comprises the step of heating a plurality of hollow Nichrome™ heater coils.

26. The method of claim 23 wherein the step of heating a flowing air mass to the preselected temperature comprises providing a heat-conductive housing.

27. The method of claim 26 wherein the step of providing a heat-conductive housing comprises the step of providing opposed air outlets.

28. The method of claim 23 wherein the step of sensing the actual temperature of the flowing air mass comprises providing a thermistor.

29. An eyeglass heater apparatus comprising:
 a fan motor for generating a flowing air mass;
 a heater for heating said flowing air mass; and
 a phase-locked loop feedback circuit for controlling both said fan motor and said heater, said circuit operably connected to said fan motor and said heater.

30. The apparatus of claim 29 further comprising a heat-conductive housing enclosing said fan motor, said heater, and said circuit.

31. The apparatus of claim 30 wherein said housing further comprises a plurality of opposed air outlets.

32. The apparatus of claim 31 wherein said opposed air outlets comprise a light beam generator for generating a light beam which when broken initiates operation of said eyeglass heater apparatus.

33. The apparatus of claim 31 wherein an exhaust temperature of said air mass remains substantially constant as volume of said air mass fluctuates.

34. The apparatus of claim 30 wherein said housing further comprises a plurality of control settings.

35. The apparatus of claim 34 wherein one of said plurality of control setting comprises a run-time setting.

36. The apparatus of claim 34 wherein one of said plurality of control settings comprises an air volume per unit time setting.

37. The apparatus of claim 34 wherein one of said plurality of control setting comprises a temperature setting.

38. The apparatus of claim 34 wherein one of said plurality of control settings comprises a cool air switch.

39. An eyeglass heater apparatus comprising:
 a fan motor comprising a single phase induction motor;
 a heater comprising a plurality of heater coils;
 a control circuit comprising means for controlling said fan motor and said heater, said means for controlling comprising a phase-locked loop feedback circuit, said control circuit operably connected to said fan motor and said heater; and
 a heat-conductive housing enclosing said fan motor, said heater and said control circuit.

40. The apparatus of claim 39 wherein said fan motor, said heater, and said control circuit are configured vertically upon and symmetrically about a central vertical axis of said housing.

41. The apparatus of claim 40 wherein said fan motor comprises a fan for generating an upwardly spiraling air mass adjacent said housing and about said central vertical axis.

42. The apparatus of claim 41 wherein said heat-conductive housing comprises a plurality of opposed air outlets for exhausting said upwardly spiraling air mass.

43. The apparatus of claim 42 further comprising means for generating a light beam between said opposed air outlets.

44. The apparatus of claim 43 wherein interruption of said light beam by a workpiece initiates operation of said eyeglass heater apparatus.

45. The apparatus of claim 39 wherein said control circuit comprises means for controlling the speed of said fan motor.

46. The apparatus of claim 45 wherein said means for controlling the speed of said fan motor comprises a phase-locked loop feedback circuit.

47. The apparatus of claim 46 further comprising means for sensing fan motor speed, said sensing means operably connected to said control circuit.

48. The apparatus of claim 47 wherein said speed sensing means comprises an optical chopper.

49. The apparatus of claim 47 wherein said speed sensing means comprises a Hall effect system.

50. The apparatus of claim 47 wherein said speed sensing means comprises a relatively rotatable magnet and coil.

51. The apparatus of claim 39 wherein said phase-locked loop feedback circuit comprises means for heat sensing.

52. The apparatus of claim 51 wherein said heat sensing means comprises a thermistor.

53. An eyeglass heater apparatus comprising:
 a fan motor comprising a single phase induction motor;
 a heater comprising a plurality of heater coils;
 a control circuit comprising means for controlling said fan motor and said heater, said control circuit operably connected to said fan motor and said heater; and
 a heat-conductive housing enclosing said fan motor, said heater and said control circuit; and
 wherein said fan motor, said heater, and said control circuit are configured vertically upon and symmetrically about a central vertical axis of said housing, said fan motor comprises a fan for generating an upwardly spiraling air mass adjacent said housing and about said central vertical axis, and said heat-conductive housing comprises a plurality of opposed air outlets for exhausting said upwardly spiraling air mass, and said apparatus further comprises means for generating a light beam between said opposed air outlets.

54. The apparatus of claim 53 wherein said control circuit comprises means for controlling the speed of said fan motor.

55. The apparatus of claim 54 wherein said means for controlling the speed of said fan motor comprises a phase-locked loop feedback circuit.

56. The apparatus of claim 55 further comprising means for sensing fan motor speed, said sensing means operably connected to said control circuit.

57. The apparatus of claim 56 wherein said speed sensing means comprises an optical chopper.

58. The apparatus of claim 56 wherein said speed sensing means comprises a Hall effect system.

59. The apparatus of claim 56 wherein said speed sensing means comprises a relatively rotatable magnet and coil.

60. The apparatus of claim 53 wherein said means for controlling said heater comprises a phase-locked loop feedback circuit.

61. The apparatus of claim 60 wherein said phase-locked loop feedback circuit comprises means for heat sensing.

62. The apparatus of claim 61 wherein said heat sensing means comprises a thermistor.

63. The apparatus of claim 53 wherein interruption of said light beam by a workpiece initiates operation of said eyeglass heater apparatus.

* * * * *